May 28, 1940.  W. L. MORRISON  2,202,393
VENTILATING DEVICE FOR AUTOMOBILES
Original Filed Oct. 4, 1933  3 Sheets-Sheet 1
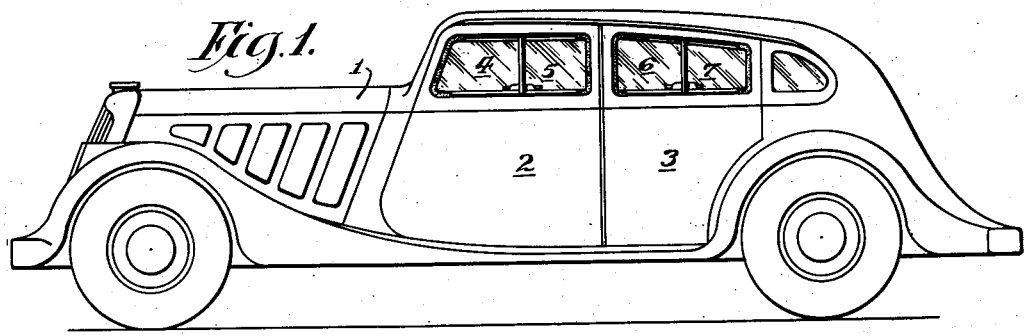
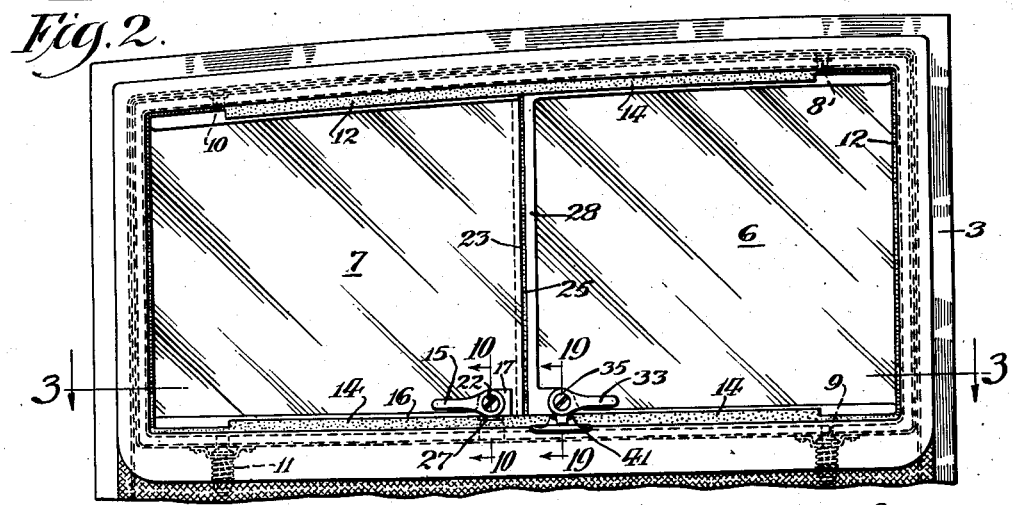
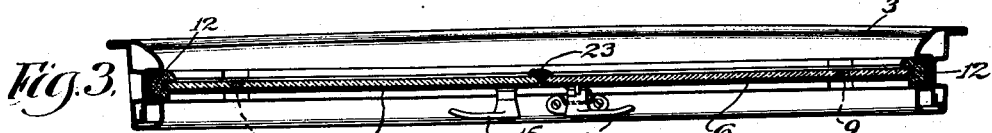
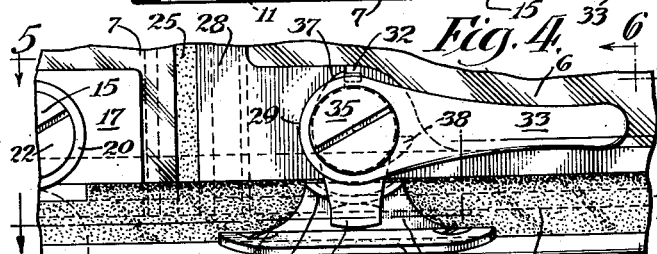
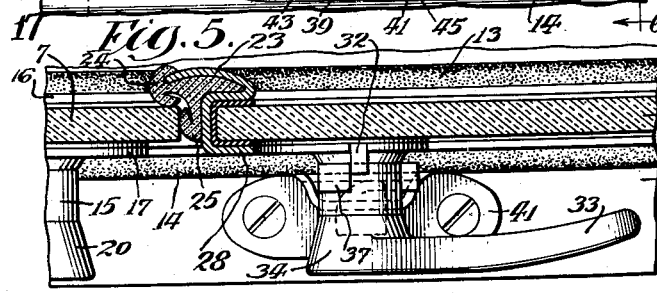
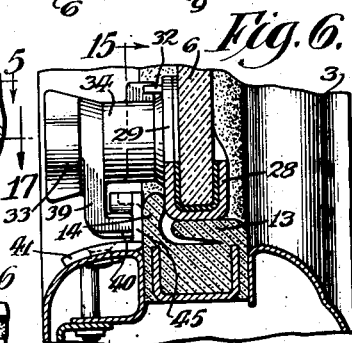
Inventor:
Willard L. Morrison,
By Parker & Carter
Attys.

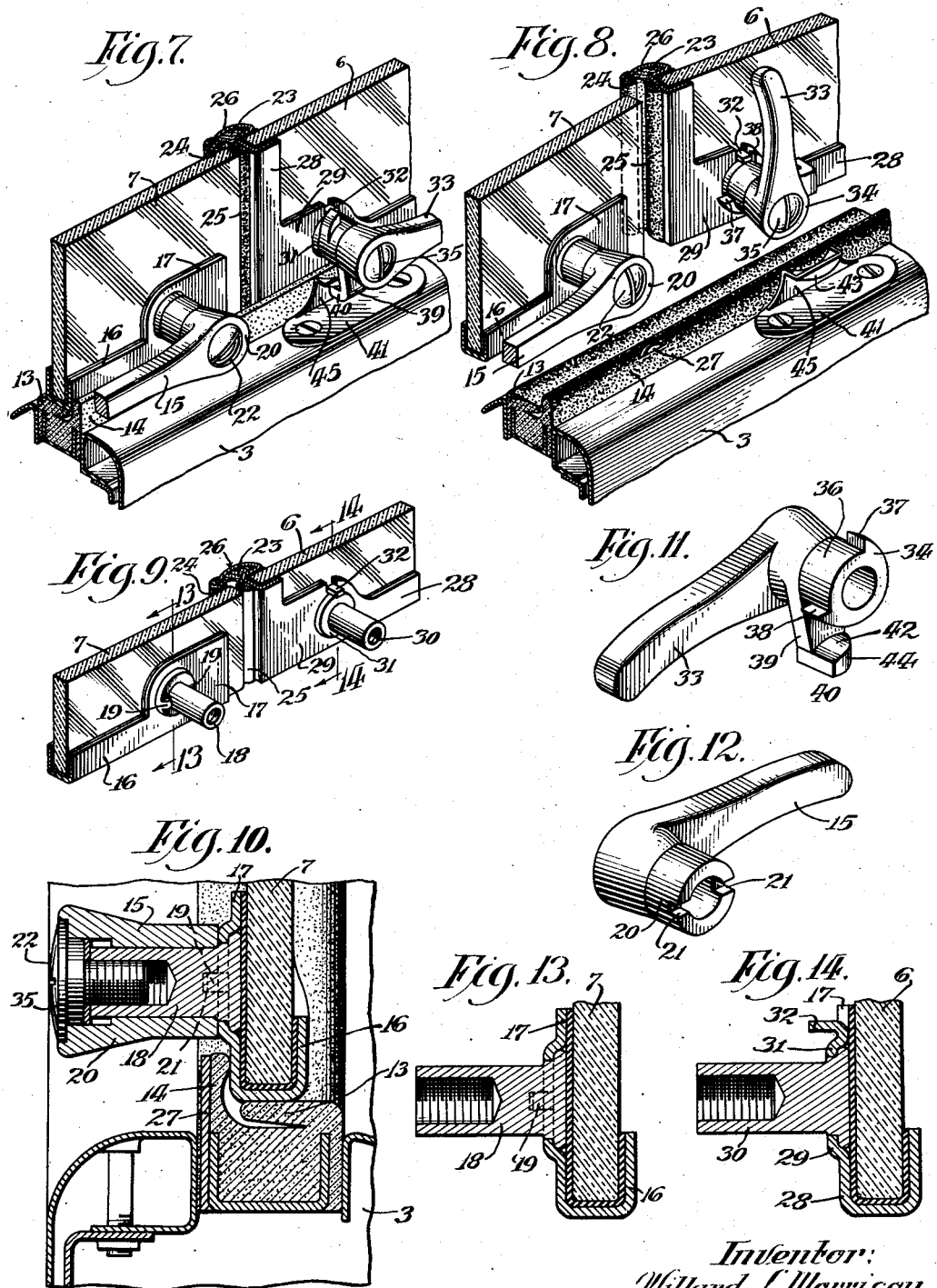

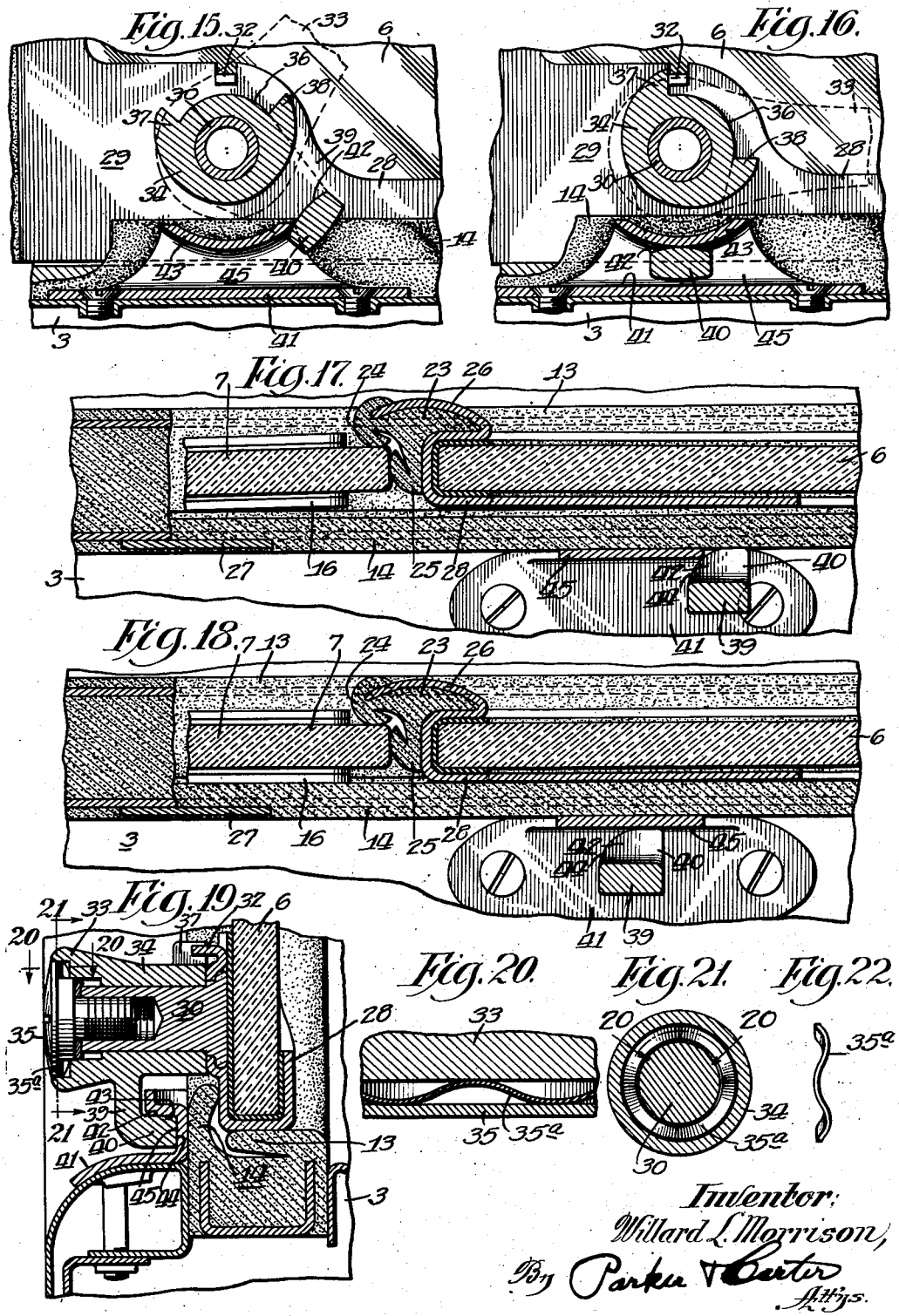

Patented May 28, 1940

2,202,393

UNITED STATES PATENT OFFICE 2,202,393

VENTILATING DEVICE FOR AUTOMOBILES

Willard L. Morrison, Lake Forest, Ill.

Application October 4, 1933, Serial No. 692,084
Renewed September 28, 1938

6 Claims. (Cl. 296—44)

This invention relates to ventilating devices for automobiles and has for its object to provide a new and improved device of this description. The invention has as a further object to provide a ventilating device for automobiles having two pivoted windows with a single locking device which locks both of them in their closed position. The invention has as a further object to provide a ventilating device for automobiles having two pivoted windows with sealing means at the edges of the windows and a locking device which, when moved to its locking position, insures the sealing of the windows simultaneously. The invention has as a further object to provide a single locking device for the two pivoted windows having both an inward and a downward pulling action to insure the proper sealing of the edges of the windows. The invention has other objects which are more particularly pointed out in the accompanying description.

Referring now to the drawings, Fig. 1 is a view showing an automobile with a ventilating device embodying the invention;

Fig. 2 is an inside aiew of one of the windows;

Fig. 3 is a sectional view taken on line 3—3 of Fig. 2;

Fig. 4 is an enlarged view of the locking device shown in Fig. 2;

Fig. 5 is a sectional view taken on line 5—5 of Fig. 4;

Fig. 6 is a sectional view taken on line 6—6 of Fig. 4;

Fig. 7 is a perspective view with parts broken away of the lower adjacent edges of the two windows with the locking device in its locking position;

Fig. 8 is a view similar to Fig. 7 with the locking device unlocked and the windows partly open;

Fig. 9 is a view similar to Fig. 7 with the locking and controlling handles and associated parts removed;

Fig. 10 is an enlarged sectional view taken on line 10—10 of Fig. 2;

Fig. 11 is a perspective view of the handle and associated parts of the locking device;

Fig. 12 is a perspective view of the controlling handle for the adjacent window;

Fig. 13 is a sectional view taken on line 13—13 of Fig. 9;

Fig. 14 is a sectional view taken on line 14—14 of Fig. 9;

Fig. 15 is an enlarged sectional view taken on line 15—15 of Fig. 6 with the locking device just before it is moved to its locking position;

Fig. 16 is a view similar to Fig. 15 showing the locking device in its locking position;

Fig. 17 is a sectional view taken on line 17—17 of Fig. 4 with the locking device just starting towards its locking position;

Fig. 18 is a view similar to Fig. 17 with the locking device in its locking position;

Fig. 19 is an enlarged sectional view taken on line 19—19 of Fig. 2;

Fig. 20 is an enlarged sectional view taken on line 20—20 of Fig. 19;

Fig. 21 is a sectional view taken on line 21—21 of Fig. 19;

Fig. 22 is a perspective view of the portion of the spring washer.

Like numerals refer to like parts throughout the several figures.

In the drawings I have shown an automobile 1 provided with a ventilating device embodying the invention. This automobile is provided with the doors 2 and 3 having the windows 4, 5, 6 and 7. These windows are pivoted between their ends so that they may be rocked about these pivots. In Fig. 2 I have shown an inside view of one set of windows. Since the other windows are made in the same way as the windows shown in Fig. 2, I will describe only one set of these windows.

In this construction the window 6 is pivotally mounted in position by the pivots 8 and 9, and the window 7 is pivotally mounted in position by the pivots 10 and 11. Some suitable means, such for example as friction devices associated with the pivots 9 and 11, is used to resist the pivotal movement of the windows so that they will be held to any position to which they are moved. The windows have a sealing means 12 which extends all the way around and which is made of non-metallic material, such for example as rubber. This sealing means engages both the edge of the windows, as shown at 13, and the side around the edge, as shown at 14. One of the windows, as for example the window 7, is provided with the controlling handle 15 for moving it. The window has a frame piece 16 which is enlarged at 17, and a pin 18 is attached thereto having laterally projecting lugs 19. The handle 15 is provided with a hollow hub 20 which fits over the pin 18. The lugs 19 fit into the notches 21 in the hub, see Fig. 12, so as to prevent the handle from turning. The handle is held in place by means of a screw 22, see Fig. 7.

There is a sealing member for sealing the adjacent edges of the windows 6 and 7. This sealing member is attached to the window 6 and consists of a sealing piece 23 which has a part 24 engaging the face of the window 7, and a part 25 engaging the end face thereof. The piece 23 is held by a holding member 26 which preferably projects over, or overlaps the edge of the window 7, see Fig. 17, thereby holding it against outward movement. The window is held against inward movement by a stop 27, the locking device is attached to the window 6.

In the construction shown the window 6 has a frame member 28 which is enlarged at 29. Connected with this frame member is a pin 30 having a collar 31. A stop 32 projects beyond the periphery of this collar. A handle 33 is provided with a hollow hub 34, into which the pin 30 is received, the handle being held in position by the screw 35. The hub is preferably countersunk for the head of the screw, and there is preferably a spring washer 35a in the countersunk portion which is pressed against the bottom of the countersunk portion when the screw is tightened, and this prevents the screw from becoming loose. This spring washer may be formed in any desired way, and I have shown one form in Figs. 20, 21 and 22 wherein the washer of spring material is crinkled or corrugated. The hub 34 is cut away at 36 so as to provide the shoulders 37 and 38. These shoulders and the stop 32 limit the movement of the handle. When the handle is moved to its full unlocking position, as shown in Fig. 8, the shoulder 38 engages the stop 32 and limits the movement. When the handle is moved to its locking position, the shoulder 37 engages the stop 32 and limits the movement. Connected with the handle 33 is an arm 39 which has a laterally projecting locking member 40 forming a moving locking member. This locking member engages a fixed locking member 41 attached to the automobile. The locking member 40 has an inclined face 42 which engages the inclined face 43 on the member 41, and it also has an inclined face 44, see Figs. 17 and 18, which engages the face 45 of the locking member 41.

When the windows are moved to their closed position, the handle 33 is moved down to the position shown in Fig. 15. The cam face 42 then engages the face 43 of the stationary locking device 41. At the same time the cam face 44 engages the cam face 45, see Figs. 17 and 18. The handle is now moved down to the position shown in Fig. 16 and because of the inclination of the cooperating cam face, the window is pulled downwardly. At the same time the cam face 44 engages the cam face 45 and this pulls both windows inwardly, the window 7 being pulled against this stop 27 by means of the member 26 on the window 6.

It will thus be seen that both windows are locked in position by the single locking device. It will further be seen that an instrument, such as a knife or the like, cannot be pushed under the window from the outside so as to unlock the device. Even if a knife or the like should be pushed under the window, it cannot reach the movable locking member and the window cannot be pried up, because the face 43 engaged by the face 42 overhangs and prevents the window from being pried upwardly. The engagement of the face 44 with the face 45 prevents the window from being pulled outwardly. The stop 27 and the stationary locking device 41 prevents the windows from being pushed inwardly. It will further be seen that by means of the stop 32 the handle 33 cannot be moved too far so as to endanger the unlocking of the window, for the handle will be automatically and positively stopped when the lock is in its proper locking position. It will further be seen that there is here provided a double cam lock, that is a lock having two camming faces at an angle to each other which completely lock the windows so that they cannot be moved outwardly, upwardly or inwardly, the reveal itself preventing downward movement.

I claim:

1. In combination with an automobile of two pivoted windows, both pivoted intermediate their front and rear edges, with their edges adjacent, there being a part on one window overlapping the other window when the windows are in closed position, an elastic sealing device between the adjacent edges of the two windows and an elastic means between the overlapping edges of the part of one window which overlaps the other window, a locking device on said first mentioned window having a movable double cam locking member and a stationary double cam locking member attached to a fixed part of the automobile and engaged by the movable cam member and a single handle for controlling said movable double cam locking member.

2. In combination with an automobile of two pivoted windows with their edges adjacent, there being a part on one window overlapping the other window when the windows are in closed positions, with a sealing device for sealing the edges of said windows, and an elastic sealing device connected with one window for sealing the space between the windows, comprising a locking device comprising a handle movably connected with the window having the sealing device, a locking member connected with said handle and movable therewith, a stationary locking member with which said locking member engages, and means associated with said locking members for pulling the window having the sealing device attached thereto, inwardly to bring it into tight sealing engagement with the associated window, said latter means being brought into operation by the handle which moves the locking member.

3. In combination with an automobile of two pivoted windows with their edges adjacent, there being a part on one window overlapping the other window when the windows are in closed position, an elastic sealing device for sealing the edges of said windows, and a sealing device connected with one window for sealing the space between the windows comprising a locking device comprising a handle movable therewith, a stationary locking member with which said locking member engages, and means associated with said locking members for pulling the window having the sealing device attached thereto, inwardly to bring it into tight sealing engagement with the associated window, said latter means being brought into operation by the handle which moves the locking member, and a stop device for stopping the movement of said handle when it reaches its locking position.

4. In combination with an automobile having a window opening of a window section pivoted in said window opening, a sealing device for said window section, a locking device on said window section, having a movable double cam locking member and a stationary double cam locking member attached to a fixed part of the automobile and engaged by the movable cam member, and a single handle for controlling said movable double cam locking member.

5. In combination with an automobile having a window opening, of a window section pivoted in said window opening, a sealing device for said window section, a locking device comprising a handle movably connected with the window section, a locking member connected with said handle and movable therewith, a stationary locking member with which said locking member engages, and means associated with said locking members for pulling the window section inwardly to bring it into sealing engagement with said sealing device.

6. In combination with an automobile having a window opening, of a window section pivoted in said window opening, an elastic sealing device for said window section, a locking device comprising a movable handle, a movable locking member connected therewith, a stationary locking member with which said movable locking member engages, and means associated with said locking members for pulling the window section inwardly to bring it into sealing engagement with said sealing device, said latter means being brought into operation by the handle which moves the locking member, and a stop device for stopping the movement of said handle when it reaches its locking position.

WILLARD L. MORRISON.